United States Patent
Ko et al.

(10) Patent No.: US 9,627,707 B1
(45) Date of Patent: Apr. 18, 2017

(54) DEVICE FOR PREVENTING DEFORMATION OF FUEL CELL STACK

(71) Applicant: HYUNDAI MOTOR COMPANY, Seoul (KR)

(72) Inventors: Haeng Jin Ko, Seoul (KR); Yong Suk Heo, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/173,438

(22) Filed: Jun. 3, 2016

(30) Foreign Application Priority Data

Oct. 19, 2015 (KR) .................. 10-2015-0145385

(51) Int. Cl.
*H01M 8/24* (2016.01)
*H01M 8/249* (2016.01)
*H01M 8/2465* (2016.01)
*H01M 8/2475* (2016.01)
*H01M 2/10* (2006.01)

(52) U.S. Cl.
CPC ......... *H01M 8/249* (2013.01); *H01M 8/2465* (2013.01); *H01M 8/2475* (2013.01); *H01M 2/1016* (2013.01); *H01M 2250/20* (2013.01)

(58) Field of Classification Search
CPC ............. H01M 2/1016; H01M 8/2465; H01M 8/2475; H01M 8/249
USPC .................................. 429/468, 471
See application file for complete search history.

(56) References Cited

U.S. PATENT DOCUMENTS

2006/0177722 A1* 8/2006 Inagaki ............... H01M 8/0271
429/434

FOREIGN PATENT DOCUMENTS

| JP | 10-241719 A | 9/1988 |
| JP | 2006-040845 A | 2/2006 |
| JP | 2006-302640 A | 11/2006 |
| JP | 2007-258164 A | 10/2007 |
| JP | 2007-273097 A | 10/2007 |
| JP | 2010-212157 A | 9/2010 |
| JP | 2010-241392 A | 10/2010 |
| JP | 2013-189159 A | 9/2013 |
| KR | 10-2012-0001717 A | 1/2012 |

* cited by examiner

Primary Examiner — Basia Ridley
Assistant Examiner — James Erwin
(74) Attorney, Agent, or Firm — McDermott Will & Emery LLP

(57) ABSTRACT

A device for preventing deformation of a fuel cell stack module includes vertical plates and a horizontal plate, The vertical plates and the horizontal plate are combined to form a deformation prevention frame and disposed between a plurality of fuel cell stack modules, which is vertically stacked, and on both surfaces of the respective fuel cell stack modules which are perpendicular to an end plate. Each of the plurality of fuel cell stacks includes an end plate disposed perpendicular to the vertical plates.

7 Claims, 7 Drawing Sheets

DEVICE FOR PREVENTING DEFORMATION OF FUEL CELL STACK

CROSS-REFERENCE TO RELATED APPLICATION

This application claims under 35 U.S.C. §119 the benefit of priority to Korean Patent Application No. 10-2015-0145385 filed on Oct. 19, 2015, the entire content of which is incorporated herein by reference.

TECHNICAL FIELD

The present disclosure relates to a device for preventing deformation of a fuel cell stack. More particularly, the present disclosure relates to a device for preventing deformation of a fuel cell stack, which is capable of easily preventing a plurality of fuel cell stack from being deformed by impact force.

BACKGROUND

In general, a fuel cell stack includes a plurality of unit cells in which a membrane electrode assembly (MEA) including an electrolyte membrane. Further, an electrode, a gas diffusion layer (GDL), a gasket, and a separating plate having a flow path are sequentially stacked in the fuel cell stack. The plurality of unit cells are coupled by a pair of end plates that provide a predetermined surface pressure.

For example, an appropriate surface pressure exerted on the plurality of unit cells is directly associated with mass transfer resistance in a GDL, that is, the appropriate surface pressure is one of essential conditions for obtaining performance of the fuel cell stack.

The fuel cell stack provided in a fuel cell vehicle needs to be protected from vibration, which occurs due to an uneven road surface when the vehicle travels, a collision of the vehicle, an external impact, or the like so that the fuel cell stack is not deformed.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and to provide a device for preventing deformation of a fuel cell stack, which is capable of easily preventing the fuel cell stack from being deformed by impact force, by mounting a deformation prevention frame having an "I" shaped cross section between a plurality of fuel cell stacks.

According to an exemplary embodiment in the present disclosure, a device for preventing deformation of a fuel cell stack having a deformation prevention frame having a structure in which vertical plates and a horizontal plate are combined between a vertically stacked plurality of fuel cell stacks on both surfaces of the respective fuel cell stacks which are perpendicular to an end plate.

The vertical plates are in contact with both side surfaces of each of an upper fuel cell stack module and a lower fuel cell stack module. The horizontal plate is connected to inner surfaces of the vertical plates and is disposed between a bottom surface of the upper fuel cell stack module and an upper surface of the lower fuel cell stack module.

The vertical plates and the horizontal plate may be integrally formed to have an "I" shaped cross-sectional structure, or formed as separate elements and then connected to each other.

Each of the vertical plates may have a rib for improving rigidity.

The vertical plate may be made of a reinforcing plastic or composite material.

The horizontal plate may be made of one of a reinforcing plastic, composite material, or metal.

Both end portions of each of the vertical plates may overlap with the end plate and coupled to the end plate by a fastening member.

Through the aforementioned technical solutions, the present disclosure provides the effects below.

First, the "I" shaped deformation prevention frame, which includes the vertical plates and the horizontal plate between the respective modules and the sides surfaces of the modules, is applied when the fuel cell stack modules are stacked, and as a result, it is possible to protect the fuel cell stack module from loads which occur due to an uneven road surface when a vehicle travels, a collision of a vehicle, external impact, or the like so that the fuel cell stack module is not deformed, and it is possible to prevent a "D" shaped deformation of the fuel cell stack module.

Second, the vertical plates and the horizontal plate, which constitute the deformation prevention frame, are simply assembled in a direction in which the vehicle travels by using a low-strength lightweight material, thereby improving rigidity of the deformation prevention frame.

Other aspects and embodiments are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention.

Figure 1:
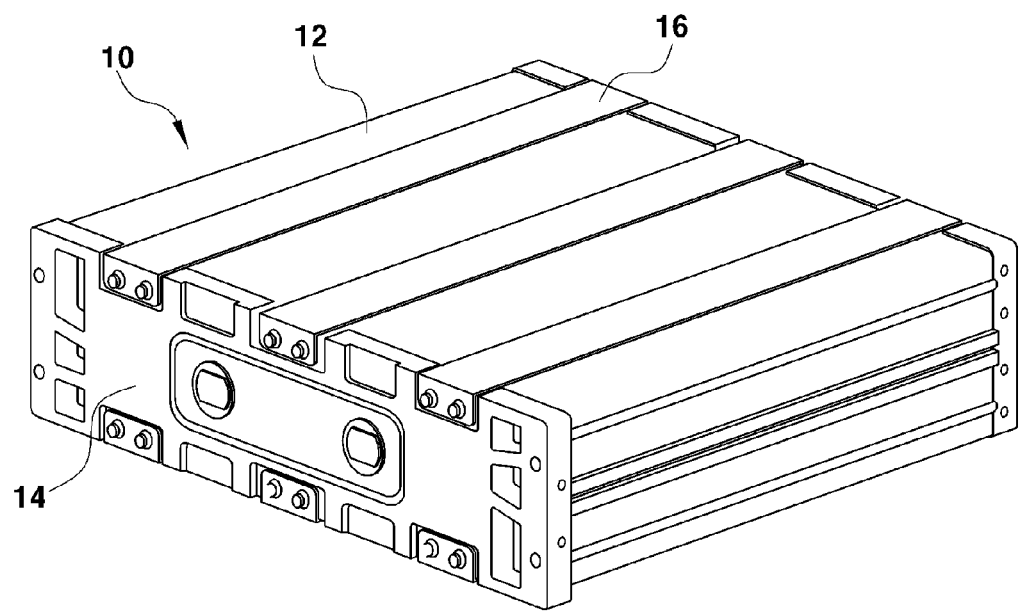
FIG. 1 is a perspective view illustrating a state in which a fuel cell stack according to a related art is assembled.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments in the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, exemplary embodiments in the present disclosure will be described in detail with reference to the accompanying drawings.

Referring to FIG. 1, a fuel cell stack 10 generally includes: a plurality of unit cells 12 which are stacked; and end plates 14 which are coupled to both sides of the plurality of unit cells 12. The end plates 14 are connected to each other by band type fastening bars 16, thereby providing a predetermined surface pressure to the plurality of unit cells 12.

In general, a fuel cell stack may be deformed (for example, in a "D" shape) due to loads which are generated because of an uneven road surface when a fuel cell vehicle travels, a collision of a vehicle, external impact, or the like.

When such a fuel cell stack is exposed to a relatively large impact load due to high vehicle speed or heavy weight of the stack for a short period of time (e.g., 0.1 second or less), displacement occurs between respective unit cells in the fuel cell stack because of an impact force and/or inertial force. In this case, the entire fuel cell stack may be deformed toward one side, thus forming a convex shape.

Figure 2A:
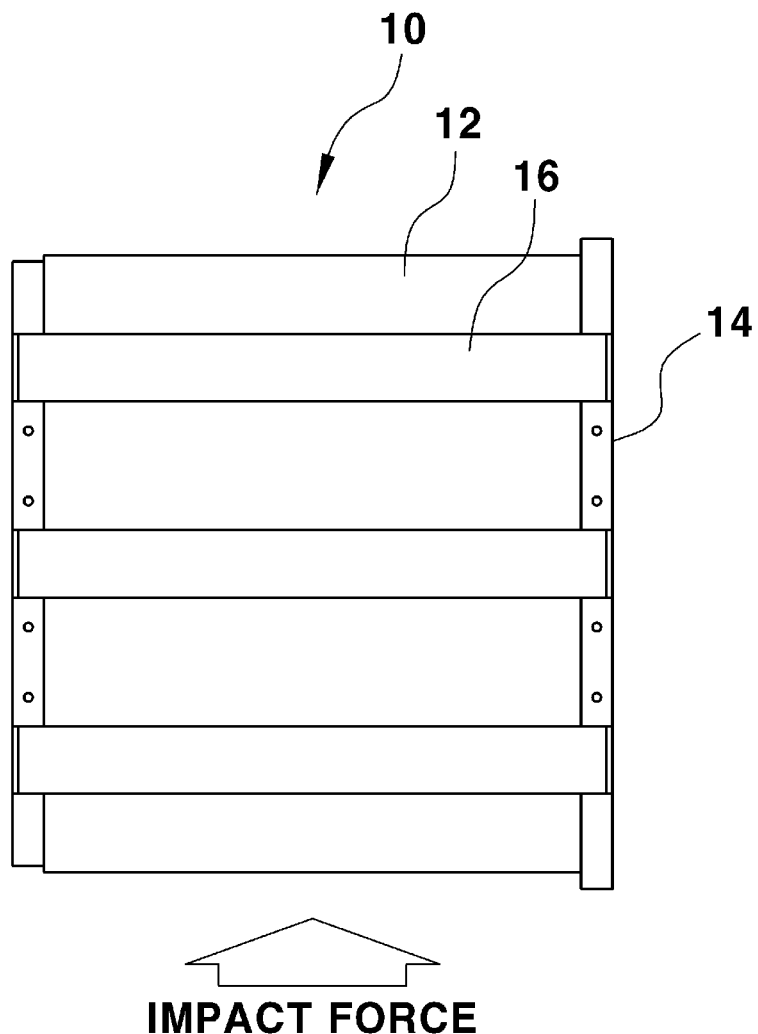
FIGS. 2A and 2B are top plan views illustrating an example in which a fuel cell stack according to a related art is deformed by an impact force.
Figure 2B:
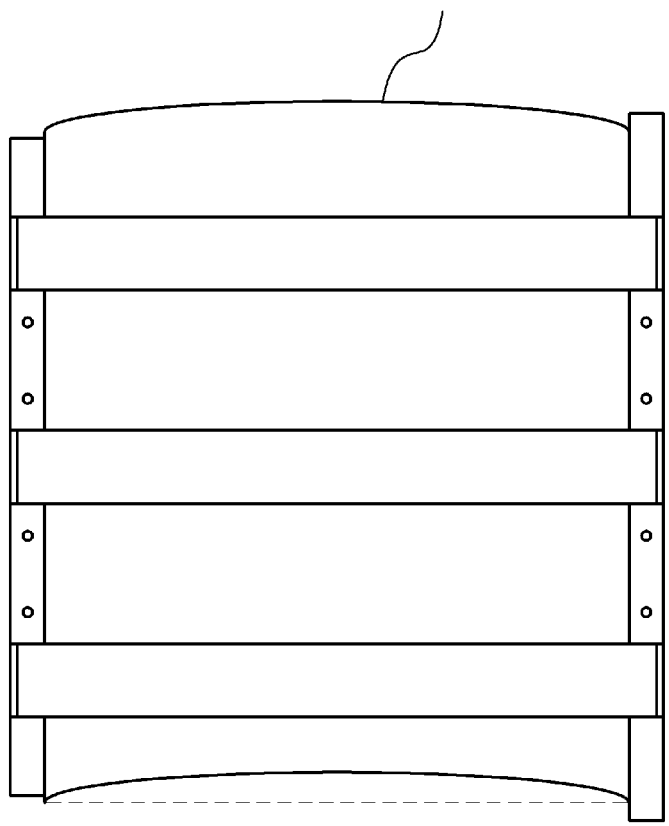

For example, as illustrated in FIGS. 2A and 2B, in a case in which the fuel cell stack 10 of the related art is deformed in a "D" shape due to an impact force, a high voltage of the stack may be transmitted to a vehicle body such that it is impossible to ensure safety of passengers. Further, hydrogen may leak due to separation of a gasket positioned on a separating plate in the fuel cell stack module 10, a function of the stack module 10 may deteriorate, and a safety accident such as fire may occur.

Thus, a deformation prevention frame is assembled to the fuel cell stack 10 in the present disclosure in order to prevent deformation of the fuel cell stack 10.

Figure 3:
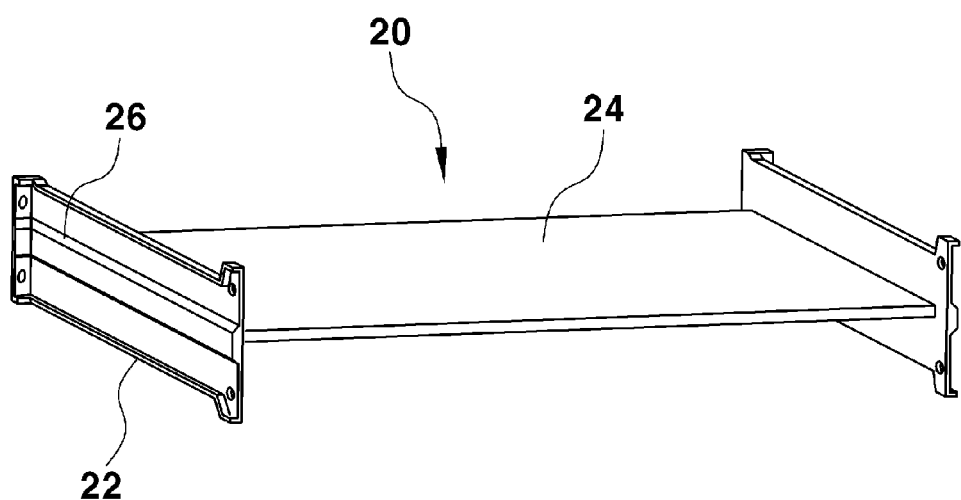
FIG. 3 is a perspective view illustrating a device for preventing deformation of a fuel cell stack according to the present disclosure.
Figure 4:
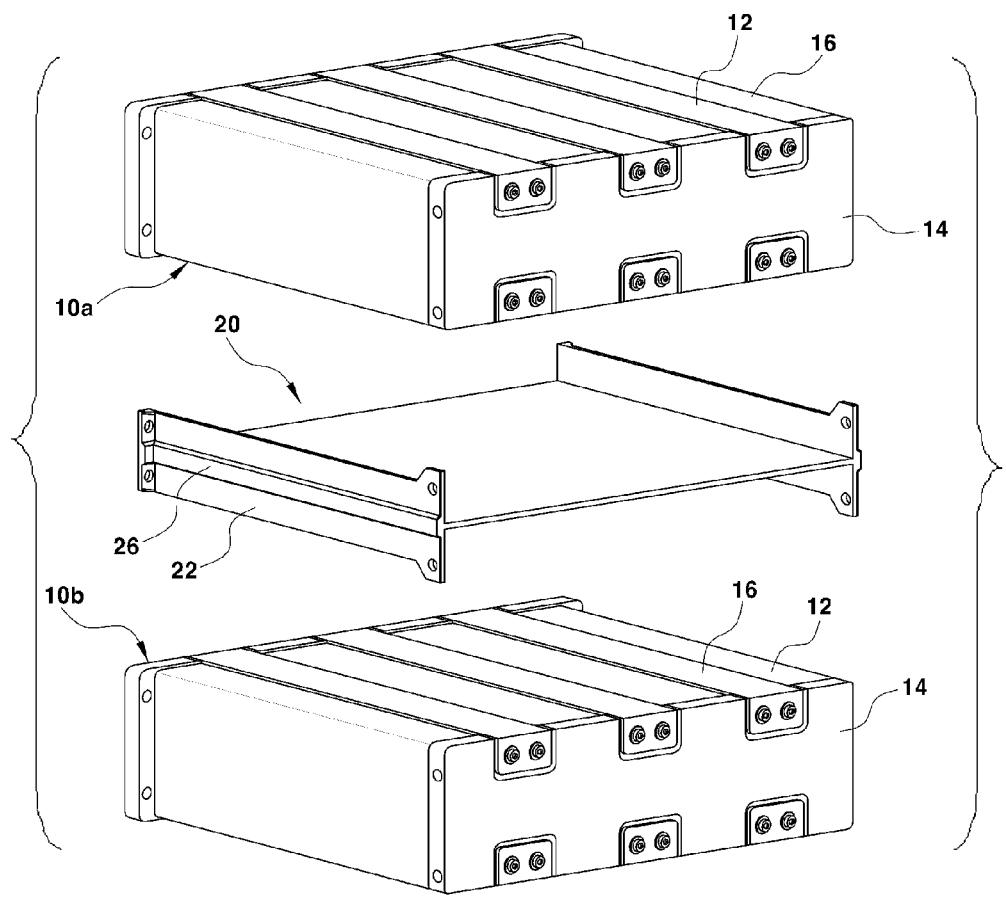
FIGS. 4 and 5 are perspective views illustrating states in which a device for preventing deformation of a fuel cell stack according to the present disclosure is assembled.
Figure 5:
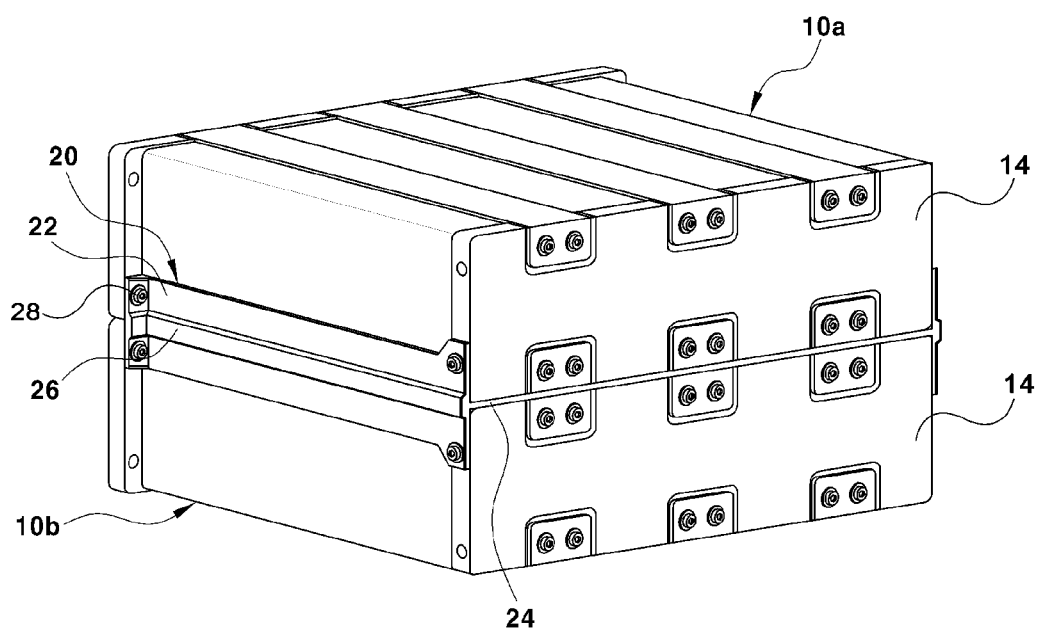

FIG. 3 is a perspective view illustrating a device for preventing deformation of a fuel cell stack according to the present disclosure, and FIGS. 4 and 5 are perspective views illustrating states in which the device for preventing deformation of a fuel cell stack according to the present disclosure is assembled.

In FIGS. 3 to 5, reference numeral 20 indicates a deformation prevention frame for preventing deformation of the fuel cell stack 10.

The deformation prevention frame 20 includes vertical plates 22 disposed at both sides of the frame 20, and a horizontal plate 24 connecting inner surfaces of the respective vertical plates 22.

In the deformation prevention frame 20, the vertical plates 22 and the horizontal plate 24 are integrally or separately formed to define an "I" shaped cross-sectional structure.

One or more rigidity reinforcing ribs 26 are formed in a longitudinal direction on the vertical plates 22 of the deformation prevention frame 20 so as to absorb and withstand an impact force.

The deformation prevention frame 20 may be made of a material with high strength to absorb and withstand the impact force, and also to reduce the total weight of the deformation prevention frame 20.

The vertical plates 22 may be made of reinforcing plastic or a composite material, and the horizontal plate is made of one of reinforcing plastic, a composite material, and metal.

When the vertical plates 22 and the horizontal plate 24 are made of the same material, they are integrally formed. When the vertical plates 22 and the horizontal plate 24 are made of different materials, they are formed as separate elements and then assembled to each other.

Here, a process of assembling the deformation prevention frame, which is manufactured as described above, to the fuel cell stack will be described below with reference to FIGS. 4 and 5.

As described above, the fuel cell stack 10 includes the plurality of unit cells 12 stacked and end plates 14 coupled to both sides of the plurality of unit cells 12. The respective end plates 14 are connected to each other by the band type fastening bars 16, thereby providing a predetermined surface pressure to the plurality of unit cells 12.

The fuel cell stacks 10 may be provided in plural and vertically stacked. Here, the horizontal plate 24 of the deformation prevention frame 20 is disposed between an upper fuel cell stack 10a and a lower fuel cell stack 10b, and the vertical plates 22 of the deformation prevention frame 20 may be in contact with both surfaces of the respective fuel cell stacks 10a and 10b which are perpendicular to the end plates 14.

Therefore, the horizontal plate 24 of the deformation prevention frame 20 is in contact with a bottom surface of the fuel cell stack 10a and an upper surface of the lower fuel cell stack 10b, and the vertical plates 22 are in contact with both surfaces of the upper fuel cell stack 10a and the lower fuel cell stack 10b.

In this case, both end portions of the vertical plates 22 overlap with the end plates 14. For example, one end portion of a vertical plate 22 is vertically bent to be in contact with an inner surface of one end plate 14, and another end portion of the vertical plate 22 is flat to be in contact with a lateral surface of another end plate 14.

The process of assembling the deformation prevention frame 20 to the fuel cell stack is completed by coupling both end portions of the vertical plates 22, which are in contact with the end plates 14, to the end plates 14 by fastening members 28 which include bolts, pin member, or the like.

Therefore, even though the impact force and/or inertial force are exerted on the plurality of fuel cell stacks 10 which are stacked together in a state in which the deformation prevention frame 20 is assembled to the fuel cell stacks 10, the impact force and/or the inertial force are absorbed by the vertical plates 22, which are supported on both surfaces of the fuel cell stacks 10, and the horizontal plate 24 which connects the respective vertical plates 22 and is disposed between the upper and lower fuel cell stacks. As a result, the unit cells 12 of the respective stacks 10 are protected from the impact force and the inertial force, thereby easily preventing "D" shape deformation of the fuel cell stack 10.

Figure 6A:
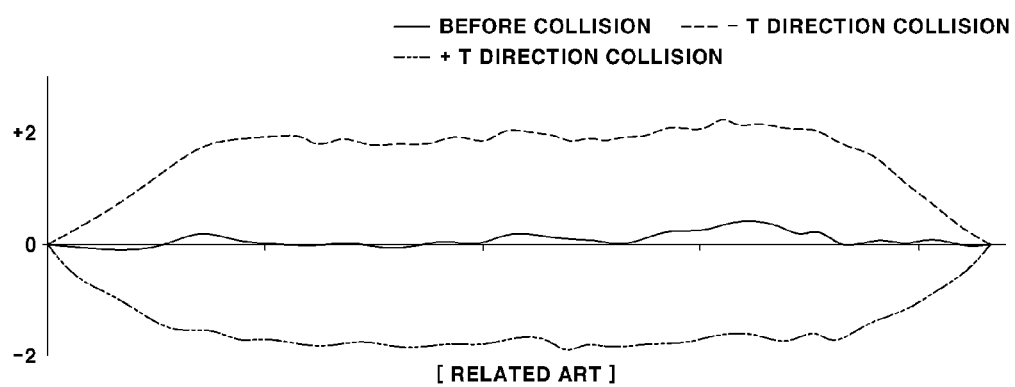
FIGS. 6A and 6B are graphs illustrating collision test results of a fuel cell stack of the related art and a fuel cell stack having a device for preventing deformation according to the present disclosure, respectively.
Figure 6B:
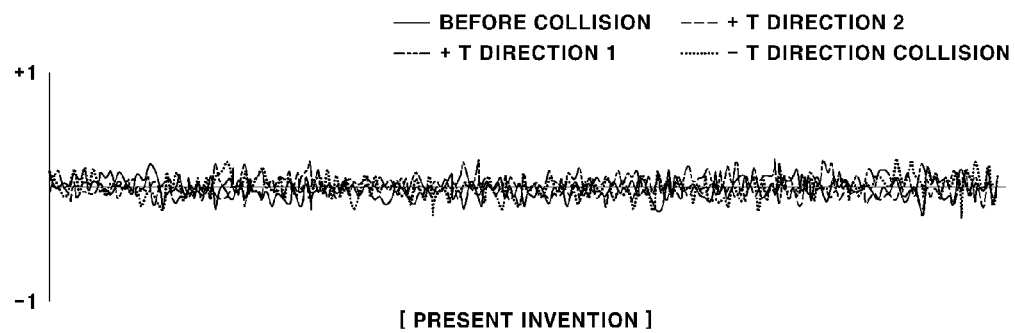

FIGS. 6A and 6B shows a collision test result for the plurality of fuel cell stacks. Referring to FIG. 6A, deformation after the collision has a "D" shape in the related art (a case in which no deformation prevention frame is provided). On the other hand, referring to FIG. 6B, "D" shape deformation is suppressed to around 1.0 mm or less with the fuel cell stack having the deformation prevention frame.

As described above, the "I" shaped deformation prevention frame 20, which includes the vertical plates 22 and the horizontal plate 24, is applied when the fuel cell stack modules are stacked. As a result, it is possible to protect the fuel cell stacks from vibration, which occurs due to an uneven road surface when a vehicle travels, collision of the vehicle, external impact, or the like. Thus, the fuel cell stack does not deform, and it is possible to easily prevent a "D" shaped deformation of the fuel cell stack.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A device for preventing deformation of a fuel cell stack, the device comprising:
   a deformation prevention frame having a structure in which vertical plates and a horizontal plate are combined between a vertically stacked plurality of fuel cell stacks on both surfaces of the respective fuel cell stacks which are perpendicular to an end plate,
   wherein one end portion of the vertical plates is vertically bent to be in contact with an inner surface of one end plate, and another end portion of the vertical plates is unbent to be in contact with a lateral surface of another end plate.

2. The device of claim 1, wherein the vertical plates are in contact with both side surfaces of each of an upper fuel cell stack and a lower fuel cell stack, and
   wherein the horizontal plate is connected to inner surfaces of the vertical plates and disposed between a bottom surface of the upper fuel cell stack and an upper surface of the lower fuel cell stack.

3. The device of claim 1, wherein the vertical plates and the horizontal plate are integrally formed to have an "I" shaped cross-sectional structure, or formed as separate elements and then connected to each other.

4. The device of claim 2, wherein a rib for reinforcing rigidity is formed on each of the vertical plates.

5. The device of claim 2, wherein the vertical plates are made of a reinforcing plastic or composite material.

6. The device of claim 2, wherein the horizontal plate is made of one of a reinforcing plastic, composite material, or metal.

7. The device of claim 2, wherein both end portions of each of the vertical plates overlap with the end plate and are coupled to the end plate.

\* \* \* \* \*